United States Patent Office

3,057,859
Patented Oct. 9, 1962

3,057,859
4α-METHYL-3-OXO-5α-STEROIDS AND A METHOD FOR PREPARATION OF SAME
David Neville Kirk and Vladimir Petrow, London, England, assignors to The British Drug Houses Limited
No Drawing. Filed June 1, 1960, Ser. No. 33,100
Claims priority, application Great Britain June 9, 1959
9 Claims. (Cl. 260—239.55)

This invention is for improvements in or relating to organic compounds, and has particular reference to new 4α-methyl-3-oxo-5α-steroids and a process for their preparation.

It is an object of the present invention to provide a new process for the preparation of 4α-methyl-3-oxo-5α-steroids and their acyl derivatives utilising as starting material a 4-thiomethyl-3-oxo-$\Delta^4$-steroid. Very few examples of this group of compounds have been described in the literature, owing to the unsatisfactory methods hitherto available for their preparation. Certain compounds of this type, however, are of value on account of their biological properties, or as intermediates in the preparation of compounds having valuable biological properties. Thus, for example, 17β-hydroxy-4α-methylandrostan-3-one and its 17-esters are valuable on account of their high anabolic/androgenic ratios compared with testosterone and its esters, a property which renders them valuable in various fields, for example in the veterinary field.

The invention also provides the following new 4α-methyl-3-oxo-5α-steroids which are of value in steroid technology, in the furtherance of steroidal research and in the application of steroidal materials to veterinary and medical practice, whether as tablets, elixirs, injections, implants, or other types of pharmaceutical preparation well known to those skilled in the art.

(1) 17β-hydroxy-2α:4α-dimethylandrostan-3-one and its 17-acetoxy and 17-propionoxy derivatives.
(2) 17β-hydroxy-4α:6α-dimethylandrostan-3-one and its 17-acetoxy and 17-propionoxy derivatives.
(3) 17β-hydroxy-4α-methyl-19-norandrostan-3-one.
(4) 20-hydroxy-4α-methyl-5α-pregnan-3-one.
(5) 4α-methyl-5α-pregnane-3:20-dione.
(6) 20-hydroxy-4α:16α-dimethyl-5α-pregnan-3-one.
(7) 4α:16α-dimethyl-5α-pregnane-3:20-dione.
(8) 11α-hydroxy-4α-methyl-17α:20:20:21 - bis - methylenedioxy-5α-pregnan-3-one.
(9) 4α-methyl-17α:20:20:21-bis - methylenedioxy - 5α-pregnane-3:11-dione.
(10) 4α-methyl-5α:25D-spirostan-3-one.
(11) 20:20-ethylenedioxy-17α-hydroxy - 4α - methyl - 5α-pregnan-3-one.
(12) 17α-hydroxy-4α-methyl-5α-pregnane-3:20-dione.
(13) 17α-acetoxy-4α-methyl-5α-pregnane-3:20-dione.

Compounds 1, 2 and 3 are of value on account of their favourable anabolic/androgenic ratios, rendering them of utility in producing anabolic effects with minimal androgenic effects.

Compounds 4 and 6 are of value as intermediates for the preparation of the corresponding 5α-pregnanedione.

Compounds 5 and 7 are of value on account of their sedative properties and as intermediates for the preparation of compounds with sedative properties.

Compounds 8 and 9 are intermediates for the preparation of 4-methylated-11-oxygenated derivatives which have antiinflammatory properties.

Compound 10 is a general raw material for the preparation of 4α-methyl-androstanolone, a compound of known utility as an anabolic/androgenic agent.

Compounds 11, 12 and 13 are valuable raw materials for the preparation of orally-active progestational agents such for example as 4α-methyl-17α-acetoxypregn-1-ene-3:20-dione.

According to the present invention there is provided a method for the preparation of 4-methyl-3-oxo-5α-steroids which comprises reacting a 4-thiomethyl-3-oxo-$\Delta^4$-steroid with a solution of an alkali or alkaline earth metal in liquid ammonia. The sulphur containing group is thereby reductively eliminated and the 4:5-ethylenic structure saturated.

The 4-thiomethyl-3-oxo-$\Delta^4$-steroids employed as starting materials in the present invention are described in our copending application No. 852,971, now Patent No. 2,989,552. They may be prepared by condensing the corresponding 3-oxo-$\Delta^4$-steroid with formaldehyde or paraformaldehyde and a thiol in the presence of a basic catalyst. It is not essential to isolate the 4-thiomethyl compounds in crystalline form, as they are generally formed in high yield, so that the total product may be employed for the reaction of the present invention if so desired.

The metal employed as the reducing agent in this invention may be an alkali metal such as lithium, sodium or potassium, or an alkaline earth metal such as calcium. The preferred metal is lithium. A solution of the metal in liquid ammonia may be brought into contact with a solution of the 4-thiomethyl steroid in an inert organic solvent which is preferably tetrahydrofuran, but other inert organic solvents such as ether, dioxan or toluene or mixtures of such solvents may be employed.

The reactants may be brought together in any convenient manner such as, for example, by adding the solution of the steroid in the inert organic solvent to the solution of the metal in liquid ammonia, or vice versa, or by mixing the steroid solution and the ammonia and allowing the ammonia to reflux and dissolve the metal from a Soxhlet or similar extraction vessel, until a blue colour persists in the reaction mixture. The blue colour, due to excess of the metal, is discharged preferably by the addition of solid ammonium chloride. The product is isolated in any convenient way, such as by allowing the ammonia to evaporate and extracting or precipitating the steroid. Possible variations in these procedures will be apparent to those skilled in the art.

The process of the invention is a general one, and may be applied to 4-thiomethyl-3-oxo-$\Delta^4$-derivatives of androstane, pregnane, sitostane, ergostane, stigmastane, cholestane and spirostane, and their 19-nor and D-homo-analogues.

The following groups do not, in general, interfere with the process of the invention:

Hydroxy or alkoxy groups, in particular at positions C–11, 17, 20 and 21.

Alkyl groups containing up to five carbon atoms, in particular methyl groups, at positions C–1, 2, 6, 7, 9, 11, 14, 16 and 17.

Ketal groups, in particular ethylenedioxy or trimethylenedioxy at positions C–11, 17 and 20, bismethylenedioxy at C–17α:20:20:21, and dialkylmethylenedioxy at C–16α:17.

Oxo-groups, in particular at positions C–11, 17 and 20 do not interfere with the process of the reaction provided that the alkali metal is present in excess but they may be reduced by the reagent to the corresponding hydroxy-derivatives, unless they are protected by the formation of stable derivatives such as ketals. Where reduction to hydroxy derivatives occurs, the latter may, if so desired, be re-oxidised to the oxo-compounds by any convenient process such as by treatment with chromium trioxide. Other methods for regenerating the oxo group will be apparent to those skilled in the art.

Esterified hydroxyl groups, in particular, at positions C–11, 17, 20 and 21 do not, in general, interfere with the process of the invention (provided that they are not esterified α-ketols), but hydrolysis of the ester group may occur. The resulting hydroxy-compound may be re-converted into an ester by esterification as will be apparent to those skilled in the art.

Ethylenic linkages not conjugated with the 3-oxo-Δ⁴-system or with other ethylenic linkages or oxo-groups, and in particular isolated ethylenic linkages at positions C–7:8 and 9:11, will not, in general, interfere with the process of the invention.

In applying the process of the invention to 4-thiomethyl-3-oxo-Δ⁴-derivatives additionally substituted by hydroxy-groups, it has been found that isolation of the resulting 4:5α-dihydro-4α-methyl-3-oxo derivatives is, in general, facilitated by acylation of the total reduction product, isolation therefrom of the required acyl-derivative, and hydrolysis of the acyl derivative if desired to yield the free hydroxy-derivative.

Following is a description, by way of example, of methods of carrying the invention into effect.

*Example 1*

4-phenylthiomethyltestosterone (5 g.) in pure dry tetrahydrofuran (100 ml.) was added to a stirred solution of lithium (0.53 g.) in refluxing liquid ammonia (500 ml.) in a vessel from which atmospheric moisture was excluded. The mixture was stirred for 2 minutes then treated with sufficient finely powdered ammonium chloride to discharge the blue colour. The ammonia was allowed to evaporate, and the residue treated with water and cholorform. The chloroform layer was washed, dried and evaporated and the residue treated with acetic anhydride (10 ml.) and pyridine (5 ml.) for ½ hour on the steambath, then the mixture was shaken with water, and the product isolated with ether, which was washed with water, dilute sulphuric acid, water, sodium hydrogen carbonate solution, and water until neutral. The ethereal solution was dried and evaporated and the residue purified from methanol to give 17β-acetoxy-4α-methylandrostan-3-one, M. P. 182 to 184° C., $[\alpha]_D^{21}$ +8° (c., 0.14 in chloroform).

*Example 2*

Sodium (1.75 g.) was substituted for lithium in Example 1, with similar results.

*Example 3*

Potassium (3.00 g.) was substituted for lithium in Example 1, with similar results.

*Example 4*

Calcium (1.72 g.) was substituted for lithium in Example 1, with similar results.

*Example 5*

2α-methyl-4-phenylthiomethyltestosterone reacted with lithium in liquid ammonia by the process of Example 1 gave 17β-acetoxy-2α:4α-dimethylandrostan-3-one, needles from methanol, M.P. 170 to 171° C., $[\alpha]_D^{28}$ +17° (c., 0.46 in chloroform), $\gamma_{max}$. 173, 1710 cm.⁻¹ in carbon tetrachloride. Saponification of the foregoing 17β-acetoxy compound (0.5 g.) with potassium hydroxide (0.2 g.) in 80% aqueous methanol (20 ml.) for ½ hour under reflux and purification from aqueous methanol (70%) gave 17β-hydroxy-2α:4α-dimethylandrostan-3-one in flakes, M.P. 182 to 184° C., $[\alpha]_D^{27}$ +8° (c., 0.33 in chloroform), $\nu_{max}$. 3633, 1708 cm.⁻¹ in carbon tetrachloride.

*Example 6*

The process of Example 5 was repeated, propionic anhydride being substituted for acetic anhydride and the product being 17β-propionoxy-2α:4α-dimethylandrostan-3-one, needles from methanol, M.P. 142 to 143° C., $\nu_{max}$. 1735, 1713 cm.⁻¹ in carbon tetrachloride.

*Example 7*

6α-methyl-4-phenylthiomethyltestosterone reacted with lithium in liquid ammonia by the process of Example 1 gave 17β-acetoxy-4α:6α-dimethylandrostan-3-one, M.P. 160 to 163° C., $[\alpha]_D^{21}$ −20° (c., 0.54 in chloroform). Saponification of the foregoing acetoxy compound as in Example 5 gave 17β-hydroxy-4α:6α-dimethylandrostan-3-one, M.P. 224 to 225° C., $[\alpha]_D^{22}$ −25.5° (c., 0.48 in chloroform).

17β - propionoxy - 4α:6-dimethylandrostan-3-one, prepared in similar manner to the 17-acetoxy compound, separated from aqueous methanol in flakes, M.P. 125 to 128° C., $[\alpha]_D^{21}$ −23 (c., 0.31 in chloroform).

*Example 8*

4-phenylthiomethyl-D-homotestosterone reacted with lithium in liquid ammonia by the process of Example 1 gave 17β-acetoxy-4α-methyl-D-homoandrostan-3-one.

*Example 9*

4-phenylthiomethyl-19-nortestosterone treated by the process of Example 1 (but omitting the final acetylation) gave 17β-hydroxy-4α-methyl-19-norandrostan-3-one (17β-hydroxy-4α-methyl-5α-oestran-3-one), needles from acetone/hexane (1:4), M.P. 160 to 161° C., $[\alpha]_D^{24}$ +31° (c., 0.19 in chloroform).

*Example 10*

17β - hydroxy - 17α-methyl-4-phenylthiomethylandrost-4-en-3-one (2 g.) in pure tetrahydrofuran (100 ml.) was added to a stirred solution of lithium (0.25 g.) in refluxing liquid ammonia (250 ml.). Solid ammonium chloride was added to discharge the blue colour, the ammonia was allowed to evaporate, and water and chloroform were added. The chloroform was washed, dried and evaporated, and the residue purified from aqueous methanol (70%). 17β - hydroxy-14α:17α-dimethylandrostan-3-one formed needles, M.P. 154 to 156° C., $\nu_{max}$. 3480, 1702 cm.⁻¹ in liquid paraffin.

*Example 11*

4 - phenylthiomethyl - 25D - spirost - 4 - en - 3 - one reacted with lithium in liquid ammonia by the process of Example 10, gave 4α-methyl-5α:25D-spirostan-3-one, plates from acetone/hexane (1:4), M.P. 216 to 218° C., $[\alpha]_D^{25}$ −25° (c., 0.54 in chloroform).

*Example 12*

4 - (p - tolylthiomethyl) - 25D - spirost - 4 - en - 3-one M.P. 164 to 166° C., $[\alpha]_D^{25}$ +9° (c., 0.53 in chloroform), $\lambda_{max}$. 228 mμ ($\epsilon$=11,745) and 254 mμ ($\epsilon$=15,860) in ethanol, prepared according to the general procedure of our co-pending application No. 852,971, now Patent No. 2,989,552, by condensing 25D-spirost-4-en-3-one, formaldehyde and toluene-p-thiol, in presence of triethylamine as catalyst, and purified from ethanol was treated by the process of Example 10, and gave 4α-methyl-5α:25D-spirostan-3-one, plates from acetone/hexane (1:4), M.P. 216 to 218° C., not depressed on admixture with the sample prepared according to Example 11.

*Example 13*

4 - (n - butylthiomethyl) - testosterone was reacted with lithium in liquid ammonia by the process of Example 1 and gave 17β-acetoxy-4α-methylandrostan-3-one, M.P. 182 to 184° C.

*Example 14*

4-cyclohexylthiomethyltestosterone was reacted with lithium in liquid ammonia by the process of Example 1 and gave 17β-acetoxy-4α-methylandrostan-3-one, M.P. 182 to 184° C.

*Example 15*

4 - (β - hydroxyethylthiomethyl) - testosterone was reacted wtih lithium in liquid ammonia by the process of Example 1 and gave 17β-acetoxy-4α-methylandrostan-3-one, M.P. 182 to 184° C.

Example 16

4-phenylthiomethylprogesterone (5 g.) in tetrahydrofuran (100 ml.) was reduced with lithium (0.53 g.) in liquid ammonia (500 ml.) by the process of Example 1. The product, 20ξ-hydroxy-4α-methyl-5α-pregnan-3-one, separated from hexane in silky needles, M.P. 168 to 171° C., $v_{max}$. 3410 and 1704 cm.$^{-1}$ in liquid paraffin.

The foregoing 20ξ-hydroxy compound was dissolved in benzene (50 ml.) and stirred with a solution of chromium trioxide (5 g.) in water (10 ml.) and acetic acid (30 ml.), with external cooling to 20 to 25° C., for 5 hours. The mixture was then diluted with water, and the benzene layer washed neutral, dried, and the solvent evaporated. Purification from acetone gave 4α-methyl-5α-pregnane-3:20-dione in silky needles, M.P. 195 to 196° C., $[\alpha]_D^{19}$ +97° (c., 0.69 in chloroform), $v_{max}$. 1704 cm.$^{-1}$ in $CS_2$, $\lambda_{max}$. 283 mμ (ε=69.4) in ethanol.

Example 17

4 - phenylthiomethylpregna - 4:9(11) - diene - 3:20-dione, treated by the process of Example 17, gave 4α-methyl - 5α - pregn - 9(11) - ene - 3:20 - dione, $v_{max}$. 1705 cm.$^{-1}$ in liquid paraffin.

Example 18

4 - phenylthiomethylandrost - 4 - ene - 3:17 - dione, treated by the process of Example 1, gave 17β-acetoxy-4α-methylandrostan-3-one, M.P. 177 to 179° C., identical with the sample obtained in Example 1. Oxidation of the crude reduction product with chromium trioxide as in Example 16 gave 4α-methylandrostane-3:17-dione, $v_{max}$. 1736, 1704 cm.$^{-1}$ in liquid paraffin.

Example 19

16α - methyl - 4 - phenylthiomethylprogesterone, treated by the process of Example 16, gave as the initial product 20ξ - hydroxy - 4α:16α - dimethyl - 5α - pregnan - 3-one, needles from hexane, M.P. 190 to 192° C., $v_{max}$. 3400, 1700 cm.$^{-1}$ in liquid paraffin. Oxidation of this product by the process of Example 16 gave 4α:16α-dimethyl-5α-pregnane-3:20-dione, prisms from hexane, M.P. 190 to 192° C., $v_{max}$. 1700 cm.$^{-1}$ in liquid paraffin.

Example 20

17α:20:20:20:21-bismethylenedioxy-4-phenylthiomethylpregn-4-ene-3:11-dione, treated by the process of Example 10, gave 11α-hydroxy-17α:20:20:20:21-bismethylenedioxy-4α-methyl-5α-pregnan-3-one which separated from chloroform/ethanol (1:4) in needles, M.P. 261 to 263° C., (decomp.), $[\alpha]_D^{20}$ −113° (c., 0.25 in chloroform), $v_{max}$. 3450 and 1696 cm.$^{-1}$ in liquid paraffin.

The foregoing 11α-hydroxy compound (2.25 g.) in anhydrous pyridine (25 ml.) was treated with pyridine/chromium trioxide complex prepared by adding chromium trioxide (2.5 g.) to pyridine (25 ml.). The mixture was stirred for 24 hours, diluted with benzene, and filtered, and the filtrate was washed with water, dilute sulphuric acid and water until neutral, dried over sodium sulphate, stirred with decolourising charcoal, filtered, and the solvent evaporated. Purification of the product from chloroform/ethanol (1:4) gave 17α:20:20:21 - bismethylenedioxy - 4α - methyl - 5α - pregnane - 3:11 - dione in needles, M.P. 290 to 292° C., (decomp.), $[\alpha]_D^{24}$ −31° (c., 0.21 in chloroform).

Example 21

20:20 - ethylenedioxy - 17α - hydroxy - 4 - (p - tolylthiomethyl) - pregn - 4 - en - 3 - one (5 g.) [prepared by the process of our co-pending application No. 852,971, now Patent No. 2,989,552, by condensing 20:20-ethylenedioxy - 17α - hydroxypregn - 4 - en - 3 - one with toluene-p-thiol and formaldehyde in the presence of triethylamine as catalyst, and purified from aqueous methanol, M.P. 158 to 159° C., $[\alpha]_D$ +73 (c., 1.18 in chloroform), $\lambda_{max}$. 227 mμ (ε=11,390) and 254.4 mμ (ε=14,300)] in pure dry tetrahydrofuran (100 ml.) was stirred at −40° C. and treated dropwise with a solution of lithium (1 g.) in liquid ammonia (500 ml.) until a blue colour persisted in the reaction mixture, when the addition was stopped and sufficient finely powdered ammonium chloride was added to discharge the colour of the solution. The ammonia was allowed to evaporate and the residue was treated with water and extracted with ether. Evaporation of the organic solvents gave a gummy residue which was purified by crystallisation from aqueous methanol (80%) containing a drop of pyridine to give 20:20 - ethylenedioxy - 17α - hydroxy - 4α - methyl-5α-pregnan-3-one, felted needles, M.P. 223 to 225° C., $[\alpha]_D^{15}$ −10° (c., 1.00 in chloroform), $v_{max}$. 3430, 1695 cm.$^{-1}$ in liquid paraffin.

Removal of the protecting ethylenedioxy group by dissolving the compound in 90% aqueous acetic acid for 18 hours at room temperature, followed by purification from aqueous methanol gave 17α-hydroxy-4α-methyl-5α-pregnane-3:20-dione, M.P. 262 to 267° C., $[\alpha]_D^{20}$ −10° (c., 0.91 in chloroform), $v_{max}$. 3470, 1700 cm.$^{-1}$ in liquid paraffin.

Example 22

The reduction process of Example 21 was repeated, and the crude product remaining after evaporation of the organic solvents was treated with acetic acid (60 ml.), acetic anhydride (15 ml.) and toluene-p-sulphonic acid (1 g.) at room temperature for 18 hours. The mixture was then diluted with water (20 ml.), and after a further 4 hours more water was added until solid material separated. Purification from aqueous methanol gave 17α-acetoxy-4α-methyl-5α-pregnane-3:20-dione as flakes, M.P. 208 to 210° C., $[\alpha]_D^{19}$ −1.5° (c., 0.96 in chloroform)

$v_{max.}^{CCl_4}$ 1739 and 1718 cm.$^{-1}$

Example 23

4-phenylthiomethylergosta-4:7:22 - trien - 3 - one was treated by the process of Example 1, extra care being taken to ensure rigid exclusion of moisture. The product was 4α-methyl-5α-ergosta-7:22-dien-3-one.

We claim:
1. A method for the preparation of 4α-methyl-3-oxo-5α-steroids which comprises reacting a 4-thiomethyl-3-oxo-Δ⁴-steroid with a solution of compound selected from the group consisting of alkali and alkaline earth metals in liquid ammonia.

2. A method as claimed in claim 1 wherein the alkali metal is lithium.

3. A method as claimed in claim 1 wherein a solution of the metal in liquid ammonia is brought into contact with a solution of the 4-thiomethyl steroid in tetrahydrofuran.

4. 20 - hydroxy - 4α:16α - dimethyl - 5α - pregnan - 3-one M.P. 190 to 192° C., $v_{max}$. 3400, 1700 cm.$^{-1}$ in liquid paraffin.

5. 4α:16α - dimethyl - 5α - pregnane - 3:20 - dione.

6. 11α-hydroxy-4α-methyl-17α:20:21-bis - methylenedioxy-5α-pregnan-3-one.

7. 4α - methyl - 17α:20:20:21 - bis - methylenedioxy-5α-pregnane-3:11-dione.

8. 4α-methyl-5α:25D-spirostan-3-one.

9. 20:20 - ethylenedioxy - 17α - hydroxy - 4α - methyl-5α-pregnan-3-one.

References Cited in the file of this patent

UNITED STATES PATENTS

| | | |
|---|---|---|
| 2,844,602 | Ringold et al. | July 22, 1958 |
| 2,937,192 | Colton | May 17, 1960 |

FOREIGN PATENTS

| | | |
|---|---|---|
| 512,940 | Great Britain | Sept. 29, 1939 |
| 686,135 | Great Britain | Jan. 21, 1953 |